(12) United States Patent
Carter

(10) Patent No.: US 6,238,171 B1
(45) Date of Patent: May 29, 2001

(54) METHOD AND APPARATUS FOR TOWING A VEHICLE

(76) Inventor: William T. Carter, 200 Mark La., Smyrna, GA (US) 30082

( * ) Notice: Subject to any disclaimer, the term of this patent is extended or adjusted under 35 U.S.C. 154(b) by 0 days.

(21) Appl. No.: 09/196,365

(22) Filed: Nov. 19, 1998

(51) Int. Cl.[7] .................................. B60D 1/52; B60P 3/12
(52) U.S. Cl. ........................ 414/563; 280/402; 280/500; 280/DIG. 5
(58) Field of Search .......................... 414/563; 280/400, 280/402, 495, 500, DIG. 5

(56) References Cited

U.S. PATENT DOCUMENTS

| | | | |
|---|---|---|---|
| 1,520,194 | * 12/1924 | Matthews | 414/563 |
| 1,690,372 | * 11/1928 | Livesay | 414/563 |
| 1,794,148 | * 2/1931 | Collins | 414/563 |
| 2,436,000 | * 2/1948 | Fleming | 414/563 |
| 3,539,062 | * 11/1970 | Allen | 414/563 |
| 4,406,476 | * 9/1983 | Brandschain | 414/563 X |
| 4,600,353 | 7/1986 | Phillips . | |
| 4,778,333 | * 10/1988 | Youmans et al. | 414/563 |
| 4,836,737 | * 6/1989 | Holmes et al. | 414/563 |
| 4,840,543 | 6/1989 | Totty . | |
| 5,052,880 | * 10/1991 | Ross | 414/563 |
| 5,540,540 | * 7/1996 | Peterson | 414/563 |
| 5,573,300 | 11/1996 | Simmons . | |
| 5,711,543 | 1/1998 | Stokes . | |

FOREIGN PATENT DOCUMENTS

| | | | |
|---|---|---|---|
| 558525 | * 9/1932 | (DE) | 414/563 |
| 687492 | * 2/1953 | (GB) | 414/563 |
| 58-112838 | * 7/1983 | (JP) | 414/563 |

* cited by examiner

Primary Examiner—Robert P. Olszewski
Assistant Examiner—Gerald J. O'Connor
(74) Attorney, Agent, or Firm—Richard C. McComas; Patent Focus, Inc.

(57) ABSTRACT

A portable towing apparatus for towing a disabled golf cart. The towing apparatus is preferably mounted onto the rear portion of a golf cart that is to be used in towing the disabled golf cart. The towing apparatus comprising, in part, a substantially inverted T-shaped member that has attached thereto a strut assembly and a gimbal cross member. A winch is provided and is mounted onto the inverted T-shaped member. The gimbal cross member engages the disabled golf cart and the winch in concert with the strut assembly disposes the disabled golf cart for towing. The gimbal movement of the cross member enables the golf cart under tow to traverse all types of terrain.

10 Claims, 9 Drawing Sheets

METHOD AND APPARATUS FOR TOWING A VEHICLE

FIELD OF THE INVENTION

The invention generally relates to an apparatus and method for towing. In particular the invention relates to a portable apparatus and method for towing a golf cart. More particularly the invention relates to a portable, golf cart mountable, apparatus for towing a disabled golf cart from a golf course and the method of use thereof.

BACKGROUND OF THE INVENTION

A golf course and clubhouse represent a considerable investment for the owners. The meticulously kept grounds that surround the golf course and clubhouse are one of the reasons why golfers frequent a particular golf course. Of course, the principle reason is to engage in or play a game of golf but the grounds and clubhouse serve to facilitate the golfer's interest.

The golf course itself is designed with the golfers' best interest in mind. The golf course is generally designed as a challenge for golfers and the aesthetics of the course are generally indicative of the cost of membership. Generally, the higher the cost of membership, the higher the aesthetics of the golf course and consequently, the higher the maintenance of the course. The maintenance of the golf course generally involves a vehicle of some type. Most golf courses are designed for a minimum of vehicle traffic. The primary vehicles found on a golf course are tractors for mowing the grass and golf carts for transporting golfers about the course.

If for any given reason, a golf cart becomes disabled while out on the golf course, it must be returned to a maintenance facility for repair. Removing the disabled golf cart from the interior of a golf course may very well be a challenge. If a standard truck-like wrecker is employed to tow the disabled golf cart back to the maintenance facility, the grounds of the course may suffer from the weight of the wrecker. The roads in the interior of the golf course are designed for golf cart traffic and do not easily accommodate truck traffic. If the grounds keeping tractor is used, it must first be transformed into a vehicle that can tow a golf cart. Simply attaching one end of a rope or chain to the tractor and the other end to the disabled golf cart is not feasible. Towing a disabled golf cart with a chain or rope up and down hills or inclines is inherently unsafe and may be destructive to both the tractor and the golf cart.

It would be desirable to have a towing system that could be easily assembled and portable. The towing system would also be of convenient size to enable mounting onto a standard golf cart. The golf cart would become a golf cart wrecker for towing disabled golf carts off the golf course to a maintenance facility.

SUMMARY OF THE INVENTION

The golfing industry is well aware of the importance of the aesthetics of a golf course. They are also keenly aware of the cost of maintaining the grounds of the golf course and the equipment such as golf carts. Golf carts that become disabled for a variety of reasons need to be quickly removed from the golf course. Once the golf cart is removed from the course, it may be repaired in a maintenance facility. The economies of quickly removing a golf cart and repairing it are self-evident. When a golf cart is disabled, it cannot be rented to golfers who desire to be transported about the golf course.

The present invention provides a portable towing system that is delineated into three distinct subassemblies. The towing system when assembled forms an apparatus that converts an ordinary golf cart into a golf cart wrecker. The towing system may also be easily disassembled and stored when not in use.

In the preferred embodiment of the present invention, the first subassembly comprising at least one elongated vertical member is connected to at least one elongated horizontal member. The union of these two members forms an inverted T-shaped structure or member. The inverted T-shaped member may be positioned in the rear of the golf cart in the area normally provided for golf clubs. Straps may be employed to secure the inverted T-shaped member to at least one canopy support rod of the golf cart. An L-shape member is connected to the inverted T-shaped member and extends outward from the rear of the golf cart.

The second subassembly is a strut assembly that is pivotally connected along the aforementioned L-shaped member. The strut assembly extends outward from the L-shaped member thereby providing mechanical advantage to the inverted T-shaped member. A winch is mounted along the vertical member and is connected to the strut assembly by a cable and pulley arrangement.

The third subassembly of the towing system is a cross member assembly that is gimbally connected to the strut assembly. The gimbal cross member engages the disabled golf cart and provides stability and security to the cart while in route to a maintenance facility for repair. When the winch is engaged the strut assembly pivots the cross member arcuately. The arcuate motion of the cross member has the effect of raising or lowering the disabled golf cart. The gimbal motion of the cross member enables the golf cart under tow to be easily maneuvered over all types of terrain.

In the second embodiment of the present invention, the first subassembly comprising at least one elongated vertical member is connected to at least one elongated horizontal member. The union of these two members forms an inverted T-shaped structure or member. The inverted T-shaped member may be positioned in the rear of the golf cart in the area normally provided for golf clubs. At least one strap may be employed to secure the inverted T-shaped member to at least one canopy support rod of the cart. The inverted T-shaped member has an extension arm connected along its vertical member. The extension arm projects outwardly from the inverted T-shaped member. This outward projection by the extension arm provides the towing system with an extended mechanical advantage. An L-shape member is connected to the inverted T-shaped member below the extension arm and extends outward from the rear of the golf cart.

The second subassembly of the second embodiment is a strut assembly. The strut is pivotally connected to the L-shaped member of the inverted T-shaped member. The strut assembly extends outward from the L-shaped member thereby providing mechanical advantage to the inverted T-shaped member. A winch is mounted along the extension arm and is connect to the strut assembly by a cable and pulley arrangement.

The third subassembly of the towing system is a cross member assembly that is gimbally connected to the strut assembly. The gimbal cross member engages the disabled golf cart and provides stability and security to the cart while in route to a maintenance facility for repair. When the winch is engaged the strut assembly pivots the cross member arcuately. The arcuate motion of the cross member has the effect of raising and lowering the disabled golf cart. The gimbal motion of the cross member enables the golf cart under tow to be easily maneuvered over all types of terrain.

When taken in conjunction with the accompanying drawings and the appended claims and reading the following detailed description of the embodiments of the invention, other features and advantages of the present invention will become apparent.

BRIEF DESCRIPTION OF THE DRAWINGS

The invention is illustrated in the drawings in which like reference characters designate the same or similar parts throughout the figures of which.

DESCRIPTION OF THE PREFERRED EMBODIMENTS

Figure 1:
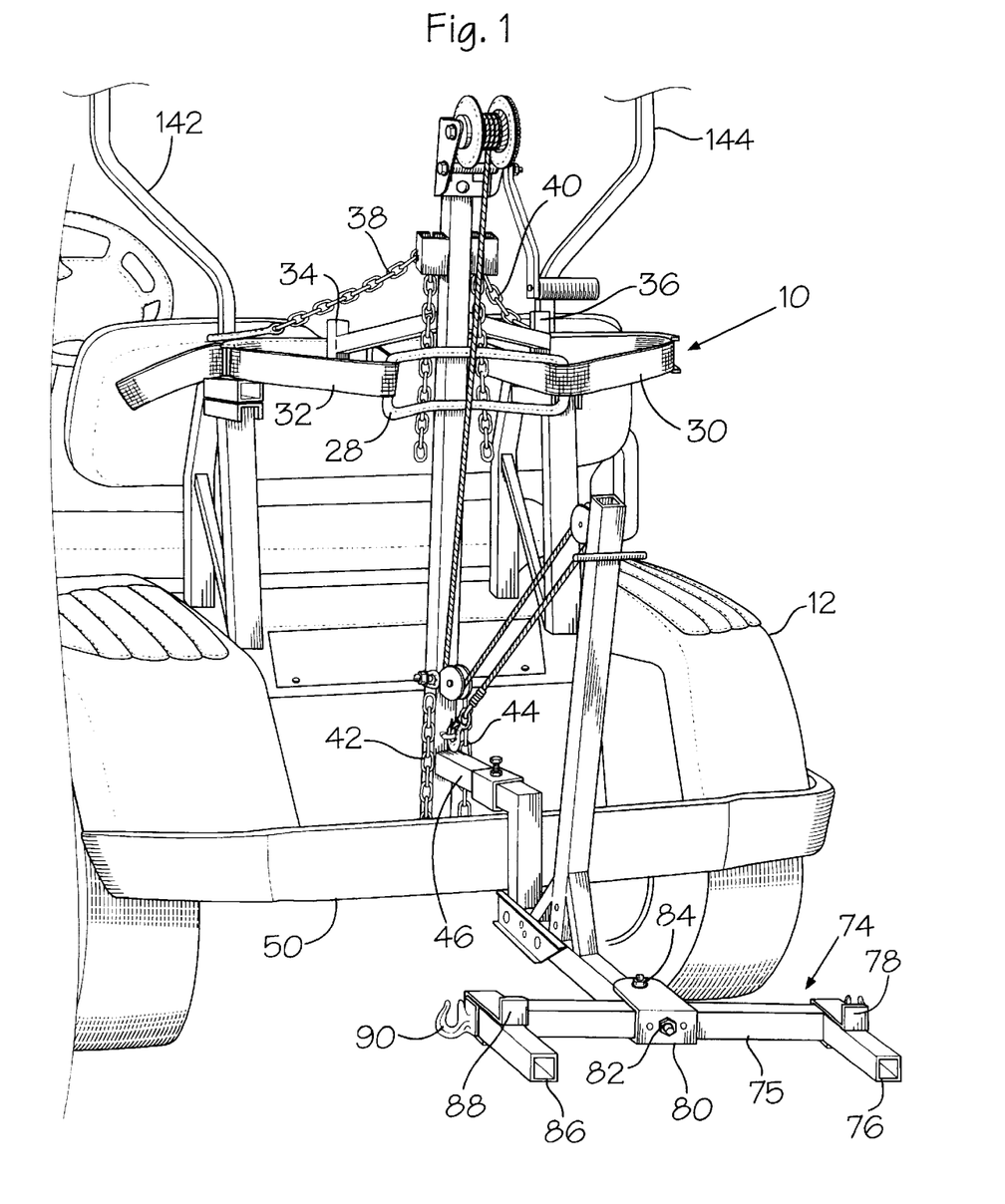
FIG. 1 illustrates a perspective view of the preferred embodiment of the present invention.

The preferred embodiment of the present invention is a towing system for small to medium size vehicles, generally illustrated at 10, FIG. 1. The vehicle 12 may be any type of vehicle that allows the towing system 10 to be mounted thereon. Vehicle 12 may, if desired, be a golf cart that is normally used to transport golfers about a golf course. Golf cart 12 requires no special modifications to receive the towing system 10.

Figure 2:
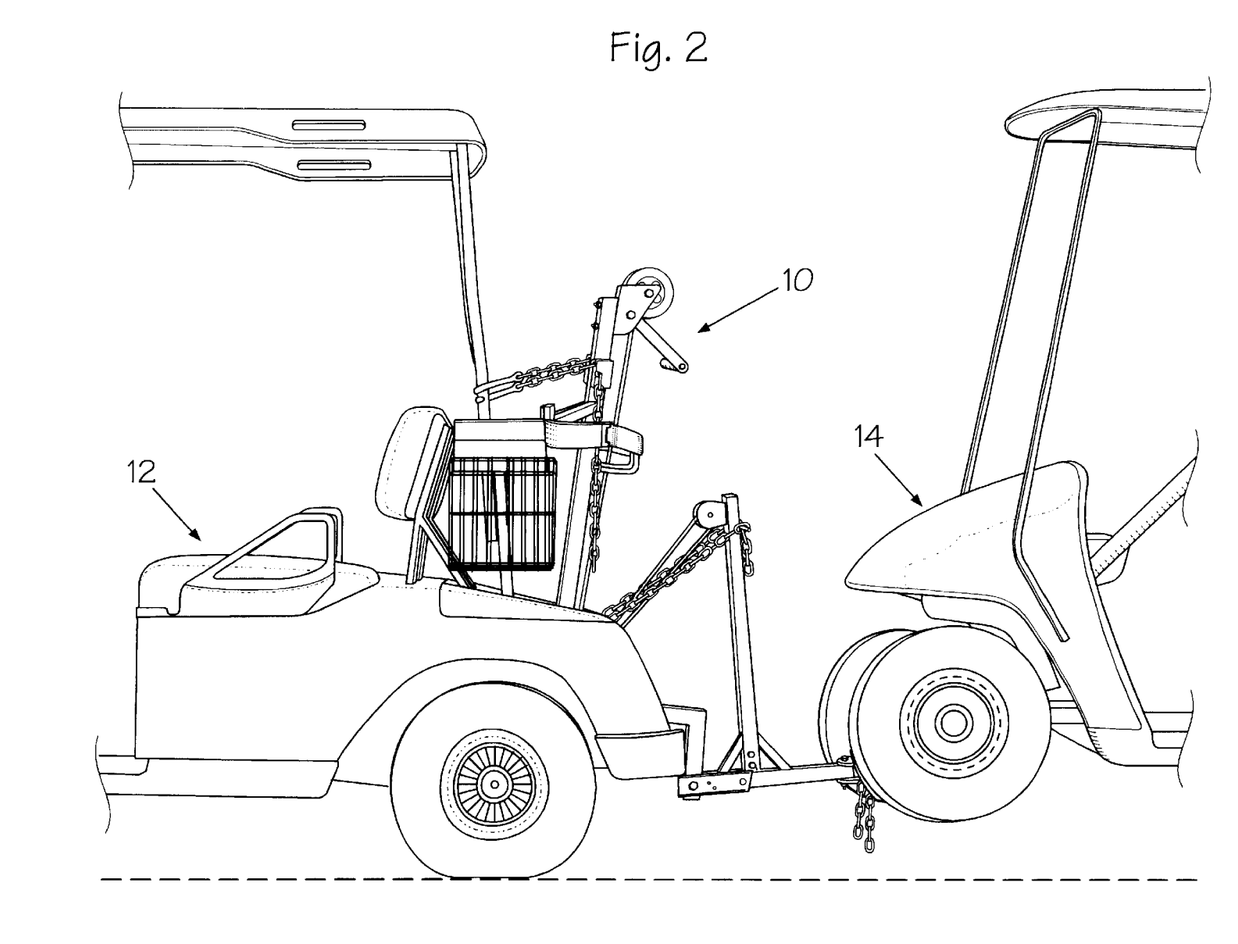
FIG. 2 illustrates a side view of the preferred embodiment of FIG. 1 engaging a vehicle to be towed.

The towing system 10 may, if desired, be mounted anywhere on the frame or body of the golf cart 12 that allows the operation of the towing system 10. The towing system 10 may, if desired, be mounted at the rear of vehicle 12 to easily engage a vehicle 14, FIG. 2, that is in need of towing. The attaching of the towing system 10, FIG. 1, to the golf cart 12 transforms golf cart 12 into a golf cart wrecker 12. Preferably, the towing system 10 is mounted to the rear of the golf cart wrecker 12. The golf cart wrecker 12 is used primarily on golf courses to tow disabled golf carts to a maintenance facility for repair.

The towing system 10, FIG. 1, (discussed in detail herein) is positioned in a space normally occupied by golf club bags. The towing system 10 may, if desired, be releasably secured to the body or frame of the golf cart wrecker 12. Once the towing system 10 is positioned in the cart, a portion of the system extends outward from the rear of the golf cart wrecker 12. This portion is releasably secured to the rear bumper or frame of the golf cart wrecker 12. The towing system 10 is now secured to the golf cart wrecker 12 and is ready for towing the disabled golf cart.

Figure 6:
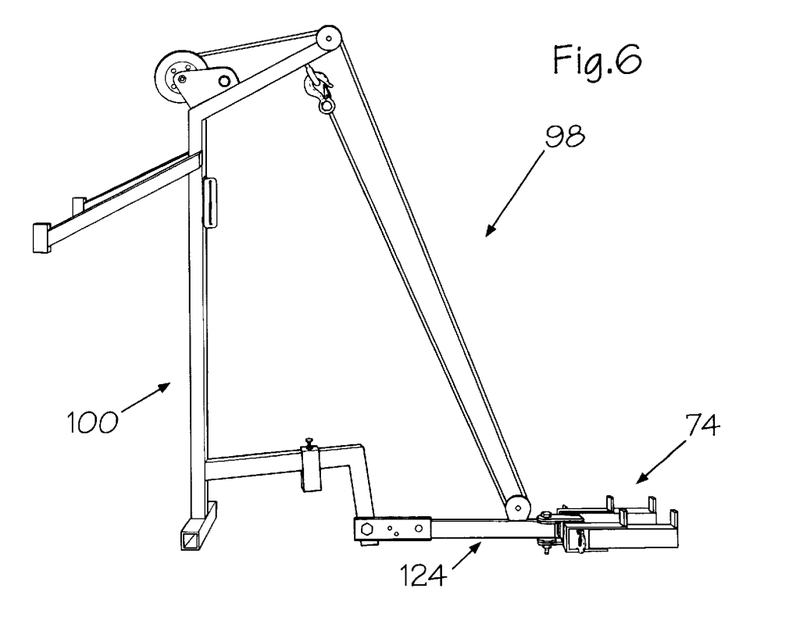
FIG. 6 illustrates a side view of the second embodiment.

The second embodiment of the present invention is a towing system and is generally illustrated at 98, FIG. 6. The towing system 98 enables the user of the system to vertically transfer the tongue weight of the vehicle being towed from the base of the towing system to the top most portion of the towing system. The towing system 98 like the towing system 10 is mounted onto a golf cart, transforming the golf cart into a golf cart wrecker.

The towing system 10 comprises three distinct, portions, subassemblies or subsystems that may, if desired, be conveniently assembled or dissembled for transporting and for attaching to the golf cart wrecker 12. The first subsystem 20, FIG. 3, comprises an inverted T-shaped member 18 and winch assembly 19. The inverted T-shaped member 18 may, if desired, be fabricated from a horizontal member 22 and a vertical member 24 or, if desired, be cast into a single inverted T-shaped member. The vertical member 24 may, if desired, be connected anywhere along the horizontal member 22 that allows the towing system 10 to operate. Preferably, the vertical member 24 is medially connected to the horizontal member 22 to form the inverted T-shaped member 18. The material used to fabricate the inverted T-shaped member 18 may, if desired, be any material that allows the towing system 10 to operate. The vertical member 24 and the horizontal member 22 are fabricated from stock steel tubing having a diameter of 1 to 3 inches. Preferably, the stock steel tubing is 1½ inches in diameter. The vertical member 24 and the horizontal member 22 are then welded together using welding techniques known in the art.

Figure 3:
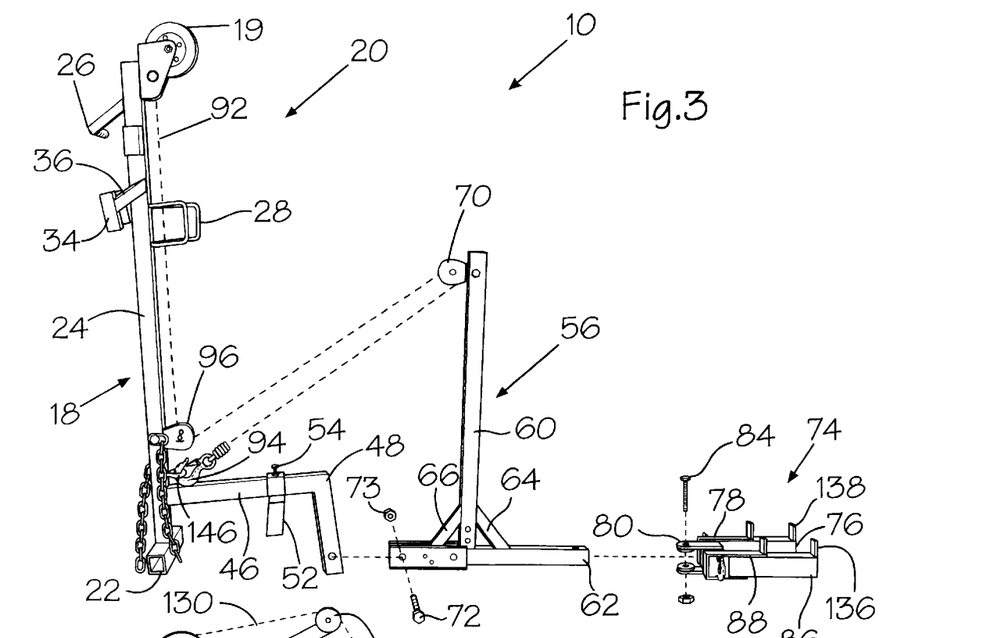
FIG. 3 illustrates a partially exploded side view of the preferred embodiment of FIG. 2.

The inverted T-shaped member 18 has a winch assembly 19 mounted thereto. The winch assembly 19 may, if desired, be mounted in any convenient place on the inverted T-shaped member 18. Preferably, the winch assembly 19 is mounted at the end of the vertical member 24 opposite from the horizontal member 22. The winch assembly 19 may, if desired, be motorized for the convenience of the user or it may have a hand crank 26 for raising and lowering the disabled golf cart.

The inverted T-shaped member 18 has a concave polyhedral member or a D-shaped ring 28 connected thereto for attaching straps 30 and 32, FIG. 1. The straps 30 and 32 loop around the D-ring 28 and secure the inverted T-shaped member to the golf cart wrecker 12. A pair of stop block members 34 and 36 are connected to the inverted T-shaped member 18 in any convenient place. The stop block members 34 and 36 may, if desired, be connected to the inverted T-shaped member 18 to provide support and in concert with the straps 30 and 32 secure the inverted T-shaped member to the golf cart wrecker 12. The stop block members 34 and 36 may, if desired, be fabricated from the same or different material as the inverted T-shaped member 18. The inverted T-shaped member 18 further comprises two pairs of safety chains 38, 40 and 42, 44 connected thereto for added retention or safety during the towing of the disabled golf cart.

A substantially L-shaped member 46, FIG. 3, is connected to the inverted T-shaped member 18 in any convenient position that allows the towing system 10 to operate. Preferably, the L-shaped member 46 is connected along the vertical member 24 and is oppositely spaced from the winch assembly 19. The L-shaped member 46 has one end 48 that extends over the bumper 50 of the golf cart wrecker 12. The L-shaped member 46, by extending over the bumper 50, provides support for the inverted T-shaped member 18. The L-shaped member 46 also has a moveable or adjustable locking mechanism 52. The locking mechanism 52 may adjustably slide along the L-shaped member 46 providing various securing positions according to the type of golf cart wrecker 12 that is used. Once a desirable position is found, a retaining screw 54 is tightened thereby securing the L-shaped member 46 and the inverted T-shaped member 18 to the golf cart wrecker 12.

The second subsystem 56, FIG. 3, is a pivotal strut member. The pivotal strut member 56 comprises a vertical member 60 connected along a horizontal member 62. The vertical member 60 is spaced from the fulcrum point connecting the L-shaped member 46 and the pivotal strut member 56 in such a way as to impart the maximum mechanical advantage. The pivotal strut member 56 is positioned 10 to 24 inches from the aforementioned fulcrum point. Preferably, The pivotal strut member 56 is positioned 15 inches from the aforementioned fulcrum point. The vertical member 60 may, if desired, be supported by brace 64 or 66. Both braces 64 and 66 may, if desired, support the vertical member 60. The pivotal strut member 56 may be fabricated from the same or different material as the inverted T-shaped member 18.

The pivotal strut member 56 is pivotally connected to the L-shaped member 46 by any convenient method known in the art. Preferably, pin 72 traverses one end of the pivotal strut member 56 and the L-shaped member 46 thereby pivotally connecting them together. A securing nut 73 may, if desired, connect to pin 72 for securing the two members together. The pivotal strut member 56 is free to rotate about the fulcrum point delineated by the insertion of the pin 72 connecting the two members together.

The third subsystem 74, FIG. 3, is a gimbal cross member. The gimbal cross member 74 is gimbally connected to the pivotal strut member 56 in any convenient arrangement that allows the towing system 10 to operate. The gimbal cross member may, if desired, be gimbally connected in the same plane as the strut member 56. The gimbal cross member 74, FIG. 1, comprises an elongated member 75 that has two oppositely spaced end members 76 and 86 connected along its horizontal lengths. The end members may, if desired, be connected to the ends of the elongated member 75. At least one supporting stop block 78 is connected about the end portion of the union of elongated member 75 and end member 76. If desired a second support end block 88 may be connected to the union of elongated member 75 and end member 86. A pair of stop blocks 136 and 138 may be added to members 86 and 76 respectively for grasping the cross member of the disabled vehicle being towed. A U-shaped bracket 80 is connected along the elongated member 75 in any convenient place that allows operable connection to the towing system 10. Preferably, U-shaped bracket 80 is medially connected between the stop blocks 78 and 88. The pin 84 traverses the U-shaped bracket 80 and the pivotal strut member 56. The U-shaped bracket 80 in concert with pin 84 provides the connection mechanism for the gimbal cross member 74 and the pivotal strut member 56. The pivotal cross member 74 may, if desired, be fabricated from the same or different material as the inverted T-shaped member 18.

Figures 7, 8A, 8B:
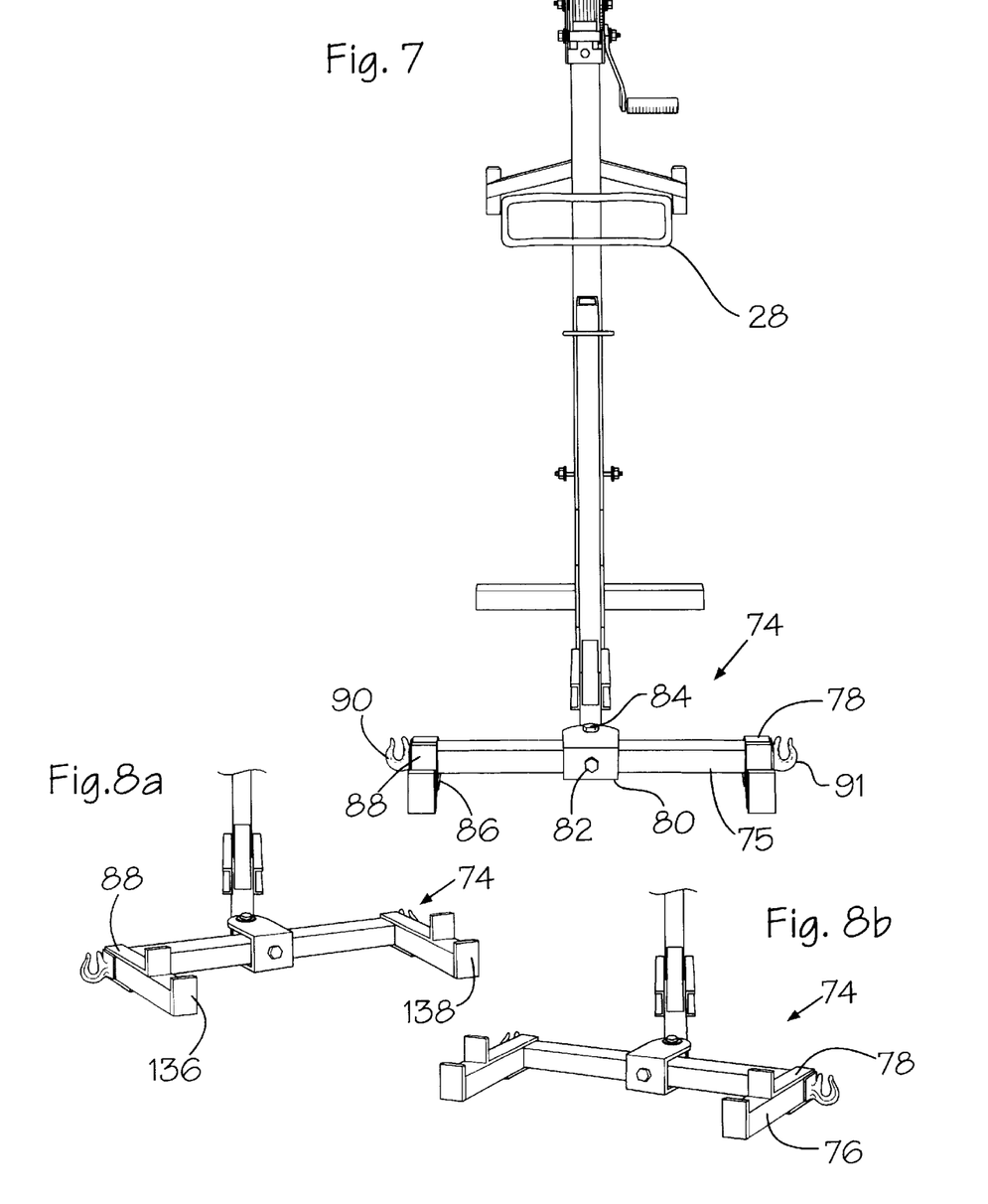
FIG. 7 illustrates a front view of the preferred embodiment of the present invention.
FIG. 8a illustrates a front view of the cross member assembly of FIG. 7, with the cross member pivoted to one side.
FIG. 8b illustrates a front view of the cross member assembly of FIG. 8a, with the cross member pivoted to the other side.
Figures 8C, 8D, 8E:
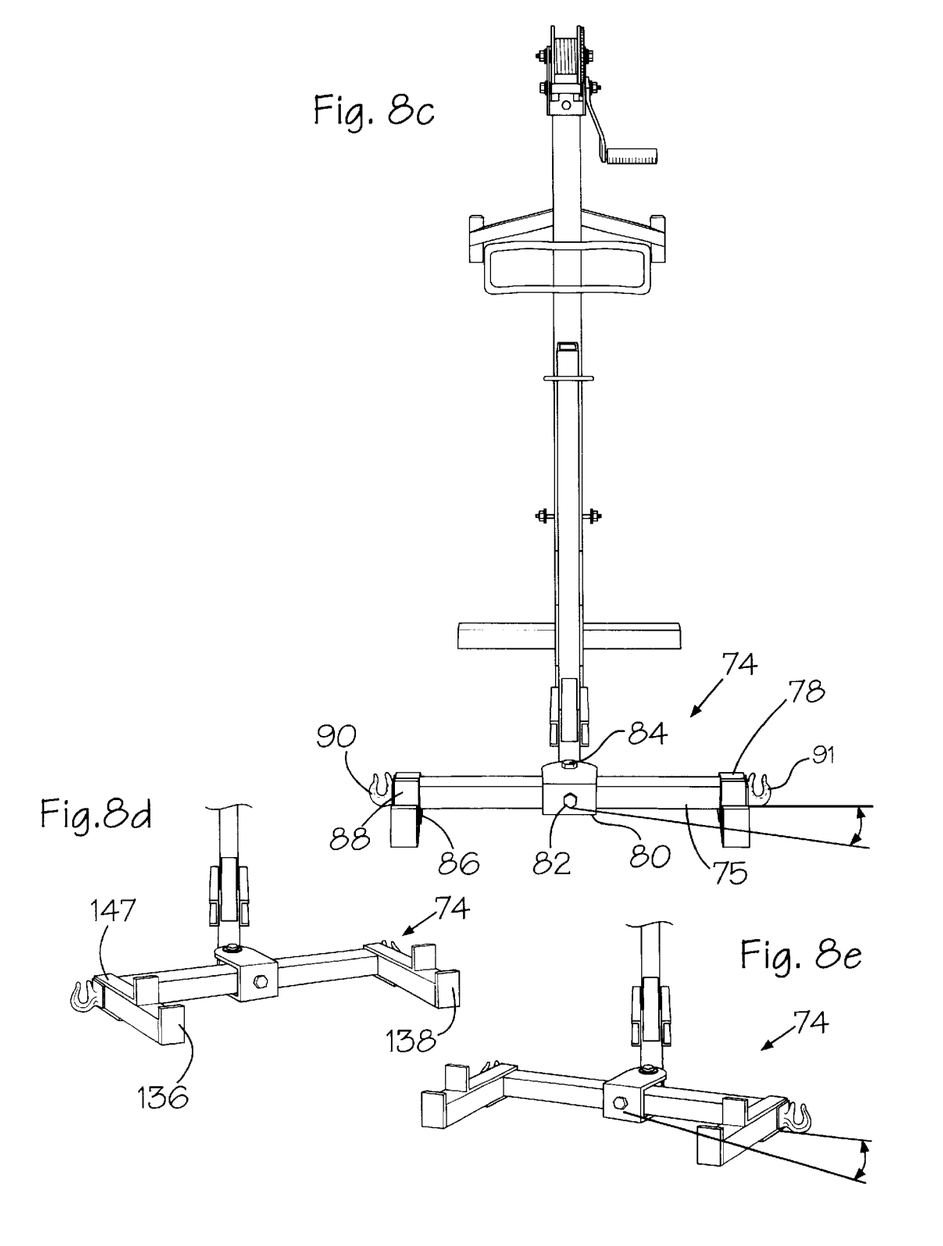
FIG. 8c illustrates a front view of the cross member assembly of FIG. 8b, with the cross member pivoted to center.
FIG. 8d illustrates a front view of the cross member assembly of FIG. 8b.
FIG. 8e illustrates a front view of the cross member assembly of FIG. 8b.

The gimbal cross member 74, FIG. 7, is free to rotate about the connecting pin 84, FIGS. 8a and 8b. The angle of rotation about the axis formed in the horizontal plane by the intersection of the pivotal strut member 56, pin 84, and the gimbal cross member 74 may, if desired, be any angle between 0° and 180°. The angle of rotation about the axis formed in the vertical plane by the intersection of the U-shaped bracket 80, pin 82, and the gimbal cross member 74 may, if desired, be any angle that allows cross member 74 to freely rotate. Preferably, the angle of rotation is in the range of 5° and 25° (degrees), FIG. 8c. The intersection of the pivotal strut member 56, the U-shaped bracket 80 and the gimbal cross member 74 in concert with pins 84 and 82 form two mutually perpendicular and intersecting axes of rotation, thus providing free angular movement or gimbal movement in two directions, FIGS. 8d and 8e. The two degrees of freedom of movement produced by the gimbally mounted gimbal cross member 74 allow for the rolling and yawing correction of movement of the golf cart 14 under tow. In normal operation, the cross member 74 grasps the axle of the disabled golf cart 14 to be towed. The size and relative position of the axle to the disabled car and the unison of movement between the golf cart wrecker 12 and the disabled golf cart 14 determine the relative or radius of rotation of the gimbal movement of the gimbal cross member 74.

A cable 92, FIG. 3, has one end affixed to the winch assembly 19 and the other end to a detachable retaining device 94. The cable 92 passes through a plurality of pulleys each exhibiting varying degrees of mechanical advantage before connecting to a hook 146. Preferably, the cable 92 passes through pulley 96 and a pulley 70 before connecting to a hook 146. Preferably, the pulleys 96 and 70 are strategically positioned on the inverted T-shaped member 18 and the pivotal strut member 56 respectively to provide maximum mechanical advantage to the towing of the disabled golf cart. A typical position for pulley 96 on the inverted T-shaped member 18 is 35 inches above the horizontal member 22. A typical position for pulley 70 on the pivotal strut member 56 is 40 inches above the horizontal member 62. The detachable retaining device 94 may, if desired, be a hook with a safety clasp connected thereto.

The Second Embodiment of the Towing System

Figure 4:
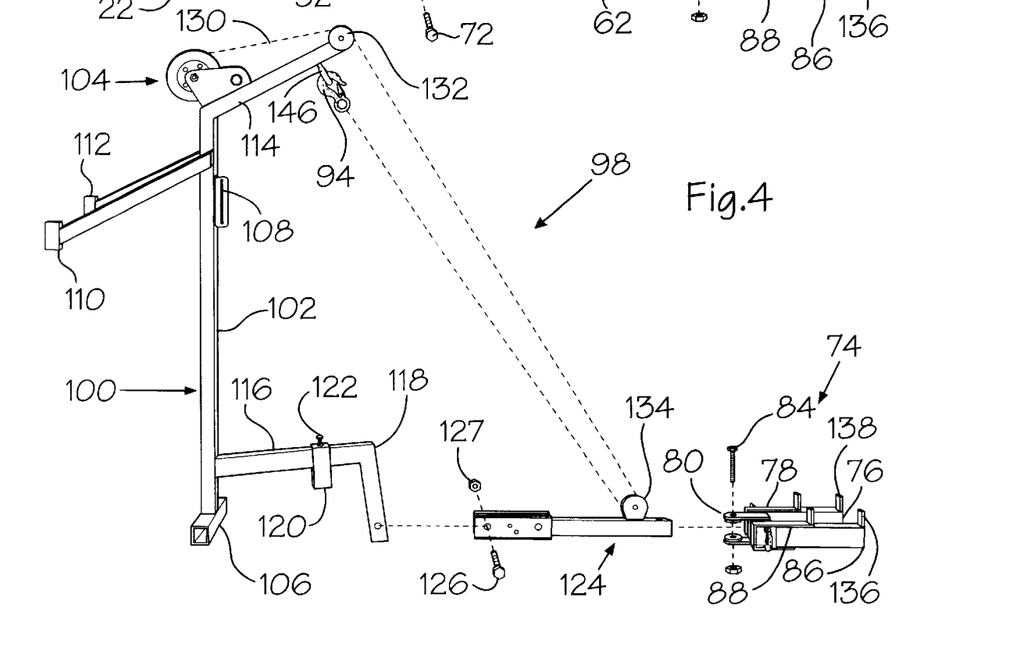
FIG. 4 illustrates a partially exploded side view of the second embodiment of the present invention.

The second embodiment of the present invention is a towing system, generally illustrated at 98, FIG. 4. The towing system 98 generally has three distinct portions, subassemblies or subsystems that may, if desired, be conveniently assembled or disassembled for transporting and for attaching to the golf cart wrecker 12. The subsystem 100, FIG. 4, comprises a inverted T-shaped member 102 with an extension arm 114. The inverted T-shaped member 100 may, if desired, be fabricated from a horizontal member 106, a vertical member 102, and an angularly displaced extension arm 114. Alternatively, if desired, the subsystem 100 may be cast into a single inverted T-shaped with an extension arm 114.

The vertical member 102 may, if desired, be connected anywhere along the horizontal member 106 that allows the towing system 98 to operate. Preferably, the vertical member 102 is medially connected to the horizontal member 106 to form the inverted T-shaped member 18. The extension arm 114 is connected at one end of the vertical member 102. The extension arm 114 is angled from the vertical member 102 in such a way as to provide the maximum mechanical advantage to the towing system 98. A typical angle for the extension arm 114, measured from the vertical member 102, is in the range of 45° to 135° (degrees). The material used to fabricate the inverted T-shaped member 100 may, if desired, be any material that allows the towing system 98 to operate. The vertical member 102, the horizontal member 106, and the extension arm 114 are fabricated from stock steel tubing having a diameter of 1 to 3 inches. Preferably, the stock steel tubing is 1½ inches in diameter. The vertical member 102, the horizontal member 106, and the extension arm 114 are then welded together using welding techniques known in the art.

The extension arm 114 has a winch assembly 104 mounted thereto. The winch assembly 104 may, if desired, be mounted in any convenient place along the extension arm 114. Preferably, the winch assembly 104 is mounted at the end of the extension arm 114 adjoining the vertical member 102. The winch assembly 104 may, if desired, be motorized for the convenience of the user or it may have a hand crank (not shown) for raising and lowering the disabled golf cart.

The inverted T-shaped member 100 has a D-shaped ring 108 connected thereto for attaching straps 30 and 32, FIG. 1. The straps 30 and 32 loop around the D-ring 108 and secure the inverted T-shaped member 100 to the golf cart wrecker 12. A pair of stop block members 110 and 112 are connected to the inverted T-shaped member 100 in any convenient place. Preferably, the stop block members 110 and 112 are connected to the inverted T-shaped member 100 to provide support and in concert with the straps 30 and 32 secure the inverted T-shaped member 100 to the golf cart wrecker 12. The stop block members 110 and 112 may, if desired, be fabricated from the same or different material as the inverted T-shaped member 100.

A substantially L-shaped member 116, FIG. 4, is connected to the inverted T-shaped member 100 in any convenient position that allows the towing system 98 to operate. Preferably, the L-shaped member 116 is connected along the vertical member 102 and is oppositely spaced from the winch assembly 104 of the inverted T-shaped member 100. The L-shaped member 116 has one end 118 that extends over the bumper 50 of the golf cart wrecker 12. The L-shaped member 116 provides support for the inverted T-shaped member 100. The L-shaped member 116 also has a moveable or adjustable locking mechanism 120. The locking mechanism 120 may adjustably slide along the L-shaped member 116 providing various securing positions according to the type of golf cart wrecker 12 that is used. Once a desirable position is found, a retaining screw 122 is tightened thereby securing the L-shaped member 116 and the inverted T-shaped member 100 to the golf cart wrecker 12.

The second subsystem 124, FIG. 4, is a pivotal strut member. The pivotal strut member 124 is pivotally connected to the L-shaped member 116 by any convenient method known in the art. Preferably, pin 126 traverses one end of the pivotal strut member 124 and the L-shaped member 116 thereby pivotally connecting them together. A securing nut 127 may, if desired, connect to pin 126 for securing the two members together. The pivotal strut member 124 is free to rotate about the fulcrum point delineated by the insertion of the pin 126 connecting the two members together.

The third subsystem 74, FIG. 4, is a gimbal cross member. The gimbal cross member 74 in this embodiment is identical to the gimbal cross member 74 discussed above. In this embodiment the gimbal cross member 74 operatively connects to the strut assembly 124 as discussed above.

A cable 130, FIG. 4, has one end affixed to the winch assembly 104 and the other end to a detachable retaining device 94. The cable 130 passes through a plurality of pulleys each exhibiting varying degrees of mechanical advantage before connecting to a hook 146. Preferably, the cable 130 passes over pulley 132 and around a pulley 134 before connecting to a hook 146. The pulleys 132 and 134 are strategically positioned on the inverted T-shaped member 100 and the pivotal strut member 124 to provide maximum mechanical advantage to the towing of the disabled golf cart. A typical position for pulley 132 is on the end of the extension arm 114. The typical position for pulley 134 is on the pivotal strut member 124 and is 10 to 20 inches from the gimbal cross member 74. Preferably, the pulley 134 is 13 inches from the gimbal cross member 74. The detachable retaining device 94 may, if desired, be a hook with a safety clasp connected thereto.

Operation of the Present Invention

Figure 5:
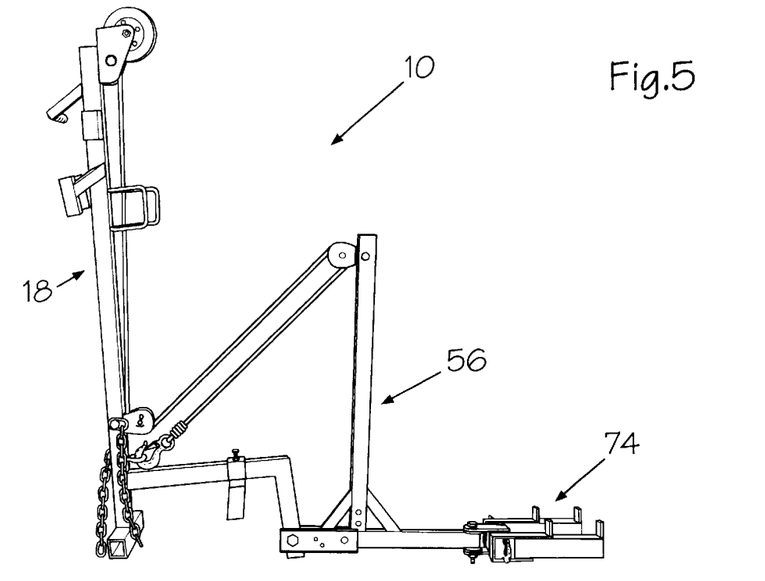
FIG. 5 illustrates a side view of the preferred embodiment of FIG. 2.

The present invention is a towing system for disabled golf carts. Both embodiments of the invention, FIGS. 5 & 6 and delineated herein are operated in relatively the same manner. They both transport disabled golf carts found on the golf course back to the maintenance facility. For illustrative purposes, only the operation of the first embodiment 10 is discussed.

Figure 9A:
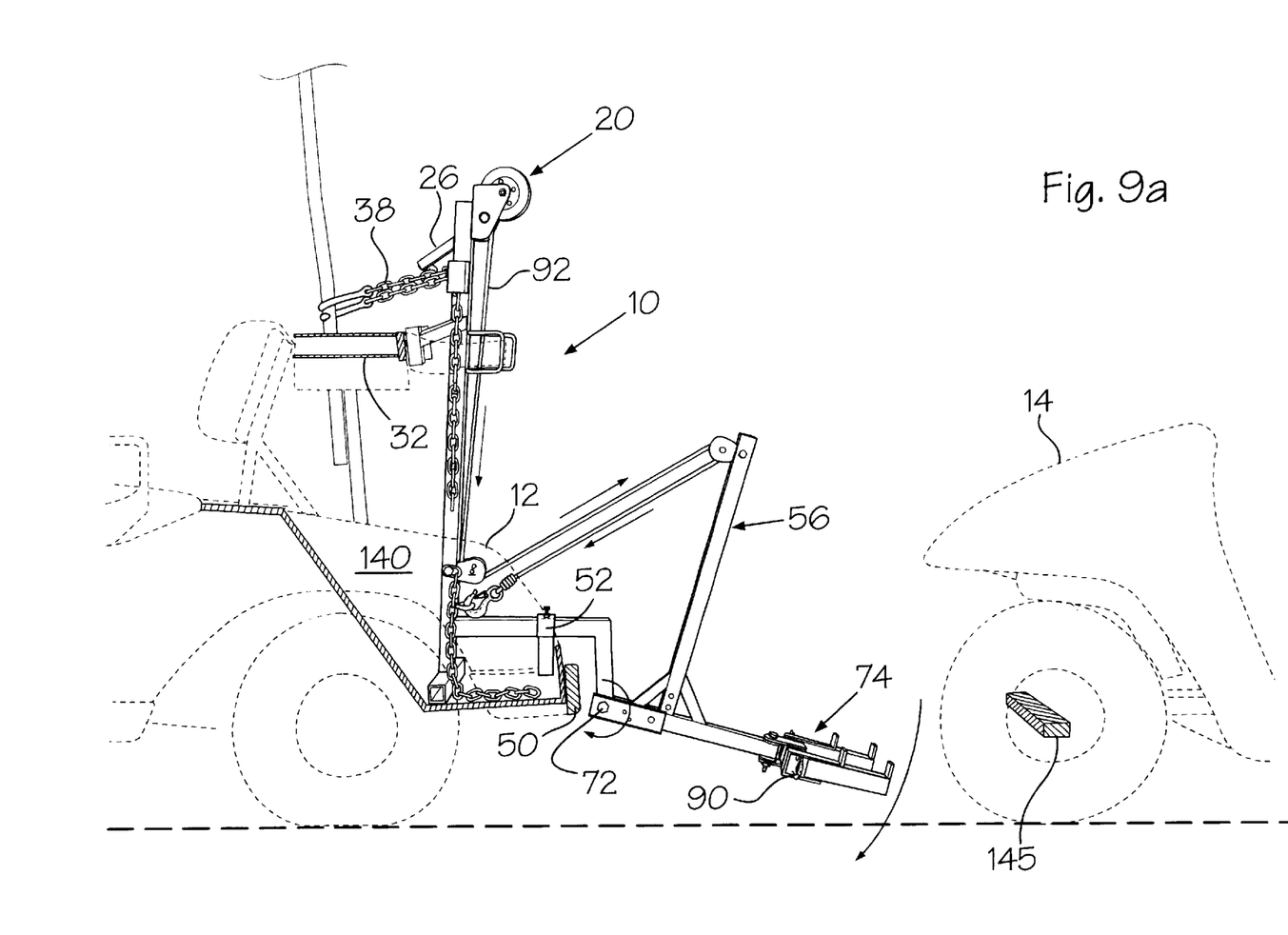
FIG. 9a illustrates a side view of the method of use of the preferred embodiment of the present invention.

The towing system 10, FIG. 9a, may, if desired, be permanently installed on a golf cart or it may remain portable. If the towing system 10 is desired to be portable it may be transported or mounted onto any golf cart.

The towing system 10, FIG. 9a, is mounted to the rear of cart 12. Normally, golf club bags occupy the space or cavity 140 now occupied by the towing system 10. The straps 30 and 32 traverse the D-shaped ring 28 and canopy poles 142 and 144 respectively and securing the towing system 10 to the cart 12. The locking mechanism 52 is properly positioned against the rear bumper 50. The towing system 10 is now securely installed onto the cart 12 and is ready to engage a disabled golf cart and tow it to the maintenance facility.

The user of the towing system 10 positions the system to the front or to the rear of the disabled golf cart. The towing system 10 functions equally well in towing disabled carts from the rear or from the front. The user grasps handle 26 of the winch 19 and begins to angularly lower the gimbal cross member 74. The gimbal cross member 74 in concert with the strut assembly 56 pivots about pin 72. The pivotal action and the unwinding of cable 92 causes the leading edge of the gimbal cross member 74 to approach the surface or plane containing the disabled golf cart.

Figure 9B:
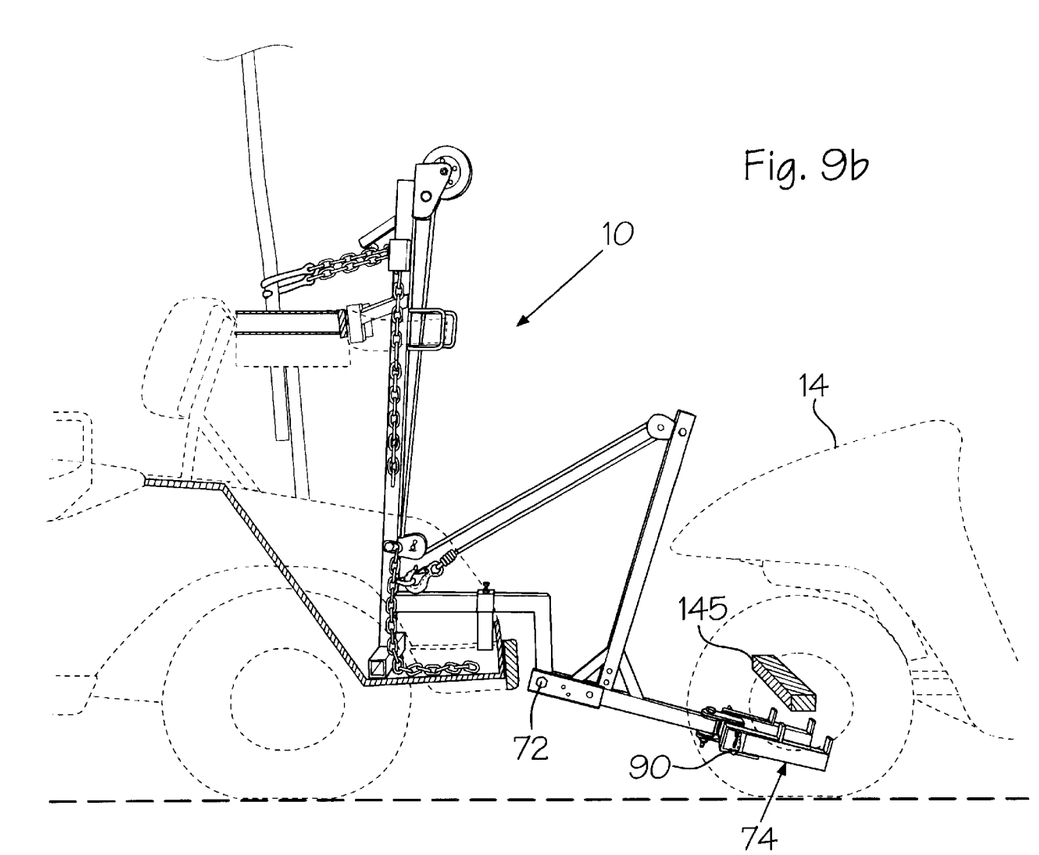
FIG. 9b illustrates a side view of the present invention of FIG. 9a, FIG. 9c Illustrates a side view of the present invention.
Figure 9C:
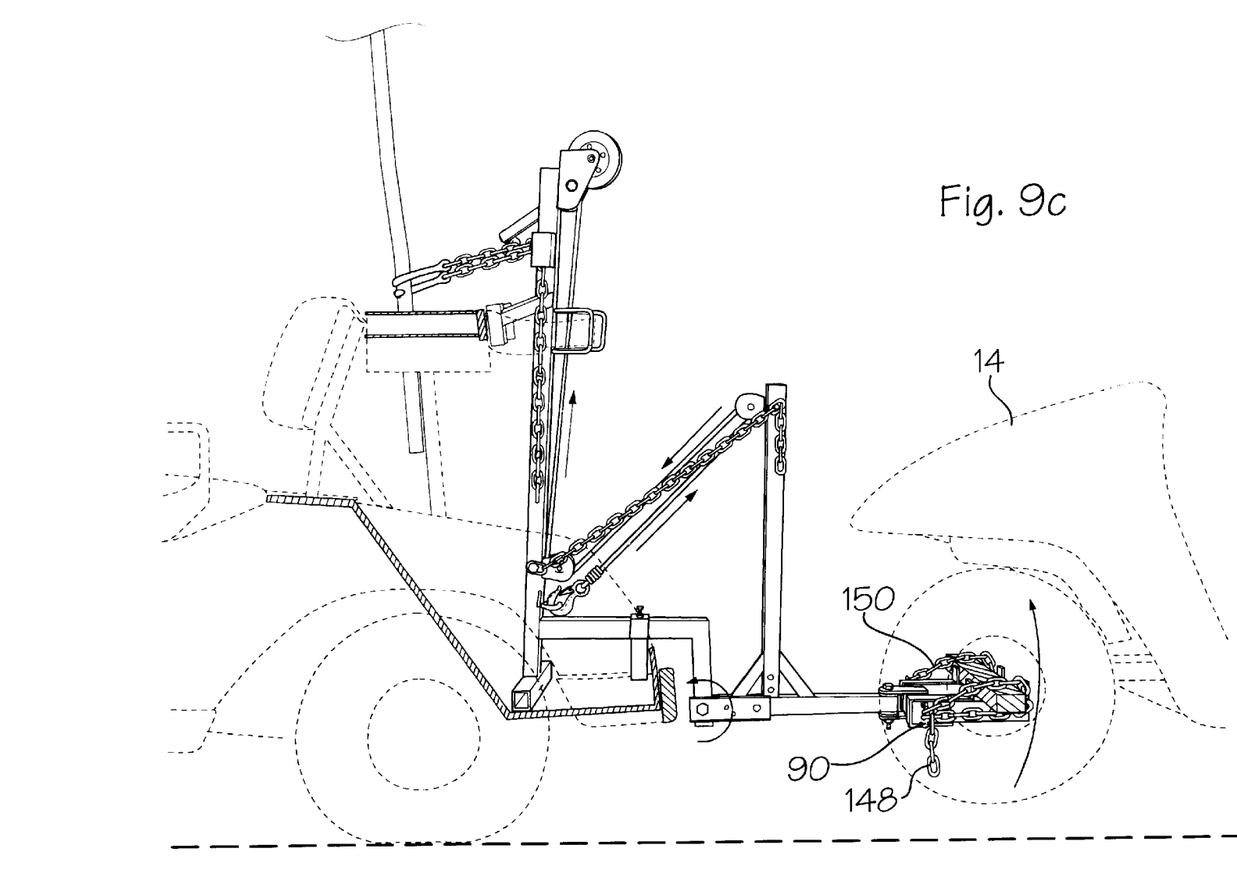

A typical golf cart has a front suspension, crossbar, or other framework attached to the cart. A typical example is crossbar 145 positioned to the front of disabled golf cart 14. The gimbal cross member 74 is positioned under the crossbar 145, FIG. 9b. The user reverses the direction of the winch 19 causing the gimbal cross member 74 to engage the crossbar 145, lifting the disabled golf cart 14 upward. The actual distance the front end of the disabled golf cart is lifted above the ground is a matter of convenience for the operator of the towing system 10 and the ability of the cart to be towed. If desired, safety chains 150 and 148, FIG. 9c, may be used to secure, via hooks 90 and 91, FIG. 7 the towing system 10 to the golf cart 14. The disabled golf cart 14 is now ready for transport to the maintenance facility.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims, means-plus-function clause is intended to cover the structures described herein as performing the recited function and not only structural equivalents but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures.

What is claimed is:

1. A winch and a cable operated towing accessory, arranged for attachment to a conventional, unmodified golf cart of the type having a rear storage compartment for carrying a pair of golf bags during a round of golf, the storage compartment having a pair of horizontally disposed belts or straps for securing the bags to the cart, wherein the towing accessory, comprises:
    a) an inverted T-shaped member having a first pulley mountably disposed thereon, said inverted T-shaped member having an elongated L-shaped member outwardly extending therefrom, said elongated L-shaped member aligned and oppositely spaced from said first pulley;
    b) an elongated strut having a first end pivotally disposed to said elongated L-shaped member, said elongated strut having a second end oppositely spaced from said first end, said elongated strut having an elongated vertical member perpendicularly disposed between said first and said second ends, said elongated vertical member having a second pulley mountably disposed thereon;
    c) said inverted T-shaped member adapted to be positioned in the golf cart's golf club storage compartment;
    d) a pair of D-rings attached to the upper portion of the inverted T-shaped member, each said D-ring aligned with one of the belts or straps, each strap or belt traversing its respective said D-ring, each strap or belt engagingly securing the upper portion of said inverted T-shaped member to the golf cart via said pair of D-shaped rings;
    e) a locking mechanism having an adjustable retaining screw disposed thereon, said locking mechanism slidably disposed along said elongated L-shaped member until said locking mechanism fits tightly against one sidewall of the storage compartment, securing said locking mechanism with respect to said L-shaped member by tightening said adjustable retaining screw in order to clamp the sidewall of the storage compartment between said L-shaped member and said locking mechanism;
    f) an elongated cross member having a pair of elongated end members spaced apart and connectively disposed thereto;
    g) a U-shaped member positioned about said elongated cross member between said pair of elongated end members, said U-shaped member being gimbally disposed to said elongated cross member and said strut's second end;

whereby the cable having one end connected to the winch and the cable's other end traversing said first and said second pulleys, the cable subsequently being detachably secured to said inverted T-shaped member.

2. A winch and a cable operated towing accessory as recited in claim 1 further comprising at least one supporting stop block connectively disposed about the union of each said elongated end member and said elongated cross member.

3. A winch and a cable operated towing accessory as recited in claim 2 further comprising a pair of supporting braces mountably disposed to said elongated strut's elongated vertical member and said elongated strut.

4. A winch and a cable operated towing accessory as recited in claim 3 wherein said pair of spaced apart elongated end members being perpendicularly disposed to said elongated cross member.

5. A winch and a cable operated towing accessory as recited in claim 4 wherein said gimbal connection being a pair of pins forming two mutually perpendicular and intersecting axes of rotation connecting said elongated strut's second end to said elongated cross member via said U-shaped member.

6. A winch and a cable operated towing accessory, arranged for attachment to a conventional, unmodified golf cart of the type having a rear storage compartment for carrying a pair of golf bags during a round of golf, the storage compartment having a pair of horizontally disposed belts or straps for securing the bags to the cart, wherein the towing accessory, comprises:
    a) an inverted T-shaped member having an elongated arm outwardly extending therefrom, said arm having a first pulley mountably disposed thereon, said inverted T-shaped member having an elongated L-shaped member outwardly extending therefrom, said elongated L-shaped member aligned and oppositely spaced from said elongated arm;
    b) said inverted T-shaped member adapted to be positioned in the golf cart's golf club storage compartment;
    c) a locking mechanism having an adjustable retaining screw disposed thereon, said locking mechanism slidably disposed along said elongated L-shaped member until said locking mechanism fits tightly against one sidewall of the storage compartment, securing said locking mechanism with respect to said L-shaped member by tightening said retaining screw in order to clamp the sidewall of the storage compartment between said L-shaped member and said locking mechanism;
    d) a pair of D-rings attached to the upper portion of the inverted T-shaped member, each said D-ring aligned with one of the belts or straps, each strap or belt traversing its respective said D-ring, each strap or belt engagingly securing the upper portion of said inverted T-shaped member to the cart via said pair of D-shaped rings;
    e) an elongated strut having a first end pivotally disposed to said elongated L-shaped member, said elongated strut having a second end oppositely spaced from said first end, said elongated strut having a second pulley mountably disposed thereon;
    f) an elongated cross member having a pair of elongated end members spaced apart and connectively disposed thereto;
    g) a U-shaped member medially spaced about said elongated cross member between said pair of elongated end members;
    h) said elongated strut's second end gimbally disposed to said elongated cross member via said U-shaped member;

whereby the cable having one end connected to the winch and the cable's other end traversing said first and said second pulleys, the cable subsequently being detachably secured to said inverted T-shaped member.

7. A winch and a cable operated towing accessory, as recited in claim 6 further comprising at least one supporting stop block connectively disposed about the union of each said elongated end member and said elongated cross member.

8. A winch and a cable operated towing accessory, as recited in claim 7 wherein said pair of spaced apart elongated end members being perpendicularly disposed to said elongated cross member.

9. A winch and a cable operated towing accessory, as recited in claim 8 wherein said gimbal connection being a pair of pins forming two mutually perpendicular and intersecting axes of rotation connecting said elongated strut's second end to said elongated cross member via said U-shaped member.

10. A winch and a cable operated towing accessory, arranged for attachment to a conventional, unmodified golf cart of the type having a rear storage compartment for carrying a pair of golf bags during a round of golf, the storage compartment having a pair of horizontally disposed belts or straps for securing the bags to the cart, wherein the towing accessory comprises:

a) a first elongated vertical member having one end medially positioned and connectively disposed to a first elongated horizontal member;

b) a second elongated horizontal member having one end connectively disposed to one end of a second elongated vertical member;

c) said second elongated horizontal member's other end connectively disposed to said first elongated vertical member at a point adjacently spaced from the connection of said first elongated vertical member and said first elongated horizontal member;

d) said first elongated horizontal member and said first elongated vertical member adapted to be positioned in the golf cart's golf club storage compartment;

e) a locking mechanism having a retaining screw disposed thereon, said locking mechanism slidably disposed along said second elongated horizontal member until said locking mechanism fits tightly against one sidewall of the storage compartment, securing said locking mechanism with respect to the second elongated vertical member by tightening said retaining screw in order to clamp the sidewall between said second elongated vertical member and said locking mechanism;

f) a pair of D-rings attached to the upper portion of said first elongated vertical member, each said D-ring aligned with one of the belts or straps, each strap or belt traversing its respective said D-ring, each strap or belt engagingly securing the upper portion of said first elongated vertical member to the golf cart via said pair of D-rings;

g) a third elongated horizontal member having an elongated third vertical member connectively disposed thereto;

h) said third elongated horizontal member having one end pivotally disposed to said second elongated vertical member's other end;

i) a fourth elongated horizontal member having a pair of elongated end members spaced apart, outwardly extending, and connectively disposed thereto;

j) a U-shaped member medially spaced about said fourth elongated horizontal member between said pair of end members;

k) a pair of pins forming two mutually perpendicular and intersecting axes of rotation connecting said third elongated horizontal member's other end to said fourth elongated horizontal member via said U-shaped member;

l) a first pulley connectively disposed to said first elongated vertical member;

m) a second pulley connectively disposed to said third elongated vertical member;

whereby the cable having one end connected to the winch and the cable's other end traversing said first and said second pulleys, subsequently being detachably secured to said first elongated vertical member.

* * * * *